US010556992B2

(12) United States Patent
Miyahara et al.

(10) Patent No.: US 10,556,992 B2
(45) Date of Patent: Feb. 11, 2020

(54) METHOD OF MANUFACTURING POLYARYLENE SULFIDE, AND POLYARYLENE

(71) Applicant: Kureha Corporation, Tokyo (JP)

(72) Inventors: Michihisa Miyahara, Tokyo (JP); Kenji Suzuki, Tokyo (JP); Yuichi Katayose, Tokyo (JP); Takayuki Kimura, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/235,900

(22) Filed: Dec. 28, 2018

(65) Prior Publication Data

US 2019/0135982 A1    May 9, 2019

Related U.S. Application Data

(62) Division of application No. 15/735,838, filed as application No. PCT/JP2016/067267 on Jun. 9, 2016, now abandoned.

(30) Foreign Application Priority Data

Jun. 12, 2015 (JP) .................................. 2015-119247

(51) Int. Cl.
  *C08G 75/0281* (2016.01)
  *B01D 3/14* (2006.01)
  (Continued)

(52) U.S. Cl.
  CPC .......... *C08G 75/0281* (2013.01); *B01D 1/28* (2013.01); *B01D 3/14* (2013.01); *B01D 3/143* (2013.01);
  (Continued)

(58) Field of Classification Search
  CPC ............... C08G 75/14; C08G 75/0263; C08G 75/0268; C08G 75/0259; C08G 75/025; B30B 9/28
  See application file for complete search history.

(56) References Cited

U.S. PATENT DOCUMENTS

| 4,859,781 A | 8/1989 | Lee et al. |
| 2005/0215759 A1* | 9/2005 | Matsuzaki ......... C08G 75/0254 528/373 |

FOREIGN PATENT DOCUMENTS

| JP | H0653728 B2 | 7/1994 |
| JP | 2002001008 A | 1/2002 |

(Continued)

OTHER PUBLICATIONS

Akiyoshi, Derwent 2014-R41754, Sep. 2014, JP 2014168740.*

(Continued)

*Primary Examiner* — Shane Fang
(74) *Attorney, Agent, or Firm* — Abel Schillinger, LLP

(57) ABSTRACT

To provide a method of manufacturing polyarylene sulfide (PAS) while efficiently recovering an organic amide solvent at a low energy cost, without using an organic solvent, from washing wastewater produced by washing a raw material mixture containing PAS and an organic amide solvent using a solvent containing water; a method of manufacturing PAS by reducing the amount of water supplied when washing the raw material mixture using a solvent containing water; and PAS manufactured by these methods. A method according to the present invention includes: a step of mixing a solvent containing water and a raw material mixture that contains PAS and an organic amide solvent, and then washing the PAS; a step of obtaining a separated liquid by solid-liquid separation; and a step of separating the separated liquid into distilled vapor having a smaller amount of the organic amide solvent and a recovered liquid having a larger amount of the organic amide solvent by heating, where the heating is performed utilizing an increase in temperature based on compressing the distilled vapor and/or compressing a heat medium heat-exchanged with the distilled vapor.

6 Claims, 1 Drawing Sheet

(51) Int. Cl.
    *C08G 75/0204*     (2016.01)
    *C08G 75/0254*     (2016.01)
    *B01D 1/28*     (2006.01)
    *C08J 3/09*     (2006.01)

(52) U.S. Cl.
    CPC ..... *C08G 75/0204* (2013.01); *C08G 75/0254* (2013.01); *C08J 3/096* (2013.01); *Y02P 70/34* (2015.11)

(56) References Cited

FOREIGN PATENT DOCUMENTS

| JP | 2007269638 A | 10/2007 |
| JP | 2013155284 A | 8/2013 |
| JP | 2014005207 A | 1/2014 |
| JP | 2014168740 A | 9/2014 |

OTHER PUBLICATIONS

International Search Report for PCT/JP2016/067267 dated Jul. 19, 2016, 3 pgs.
First Office Action from the Japanese Patent Office for PCT/JP2016/067267/JP2017-523701 with dispatch date of Dec. 5, 2017, 6 pgs.
Akiyoshi, Derwent 2014-R41754, Sep. 2014, JP 2014168740, 5 pgs.
Non-Final Office Action from USPTO for U.S. Appl. No. 15/735,838 dated Jul. 11, 2018, 7 pgs.
Final Office Action from the USPTO for U.S. Appl. No. 15/735,838 dated Nov. 9, 2018, 7 pgs.

\* cited by examiner

METHOD OF MANUFACTURING POLYARYLENE SULFIDE, AND POLYARYLENE

CROSS-REFERENCE TO RELATED APPLICATION(S)

This application is a divisional and claims priority to U.S. patent application Ser. No. 15/735,838, entitled "METHOD OF MANUFACTURING POLYARYLENE SULFIDE, AND POLYARYLENE SULFIDE," by Michihisa MIYAHARA, Kenji SUZUKI, Yuichi KATAYOSE, and Takayuki KIMURA, filed Dec. 12, 2017, which is the National Stage of International Application No. PCT/JP2016/067267, entitled "PROCESS FOR PRODUCING POLY(ARYLENE SULFIDE), AND POLY(ARYLENE SULFIDE)," by Michihisa MIYAHARA, Kenji SUZUKI, Yuichi KATAYOSE, and Takayuki KIMURA, filed Jun. 9, 2016, which claims priority to Japanese application 2015-119247, entitled "PROCESS FOR PRODUCING POLY(ARYLENE SULFIDE), AND POLY(ARYLENE SULFIDE)," by Michihisa MIYAHARA, Kenji SUZUKI, Yuichi KATAYOSE, and Takayuki KIMURA, filed Jun. 12, 2016, of which all three applications are assigned to the current assignee hereof and incorporated herein by reference in their entireties.

TECHNICAL FIELD

The present invention relates a method of manufacturing polyarylene sulfide, and polyarylene sulfide.

BACKGROUND ART

Polyarylene sulfides (hereinafter, may be abbreviated as "PAS") as represented by polyphenylene sulfides (hereinafter, may be abbreviated as "PPS") are engineering plastics having excellent heat resistance, chemical resistance, flame retardant properties, mechanical strength, electrical properties, dimensional stability, and the like. PAS can be molded into various molded products, films, sheets, fibers, and the like by a general melt processing method such as extrusion molding, injection molding, compression molding, and the like, and therefore are widely used in a wide range of technical fields such as electrical apparatuses, electronic apparatuses, automotive apparatuses, packaging materials, and the like.

A well-known representative example of a PAS manufacturing method includes a method of separating and recovering PAS through washing and drying from a reaction liquid containing PAS obtained by polymerization reacting a dihalo aromatic compound (herein after, may be abbreviated as "DHA") such as paradichlorobenzene (hereinafter, may be abbreviated as "pDCB") or the like, and a sulfur compound such as an alkali metal sulfide, alkali metal hydrosulfide, or the like as a sulfur source under heating conditions, in an organic amide solvent such as N-methyl-2-pyrrolidone (hereinafter, may be abbreviated as "NMP") or the like.

The polymerization reaction is a desalting polycondensation reaction, and for example, an alkali metal halide (such as NaCl) or other byproduct alkali metal salt, dimer, trimer, or other low polymer, impurity (such as volatile substance and substance with a high boiling point), or the like is generated in addition to the PAS as a reaction product, and after the reaction, unreacted raw material remains. Therefore, the organic amide solvent, byproduct alkali metal salt, low polymer, impurity, or the like is present between particles or inside the particles of the PAS after the polymerization reaction, or in the reaction liquid. Therefore, PAS separated from the reaction liquid containing PAS is recovered after washing thoroughly to remove the organic amide solvent, byproduct alkali metal salt, low polymer, impurity, and the like, and thus the quality of the PAS as a product is improved and maintained.

The organic amide solvent removed by the washing is preferably recovered and re-used from the perspective of resource saving, cost reduction, and the like. Examples of methods of recovering an organic amide solvent from washing wastewater containing the organic amide solvent using a solvent containing water as a washing liquid in the aforementioned washing in order to remove the organic amide solvent include: methods of directly distilling the washing wastewater; methods of extracting using a specific organic solvent such as branched alkyl alcohol or the like (for example, Patent Documents 1 to 3); and the like.

CITATION LIST

Patent Literature

Patent Document 1: JP 06-53728 B
Patent Document 2: JP 2002-1008 A
Patent Document 3: JP 2007-269638 A

SUMMARY OF INVENTION

Technical Problem

For the method of directly distilling the washing wastewater, the following point is a problem. Normally, the boiling point of an organic amide solvent is higher than the boiling point of water, and therefore, energy required for water evaporation primarily is the energy required for distillation during the aforementioned distillation. Evaporative latent heat of water is large, and therefore, in order to evaporate water in the aforementioned distillation, a large amount of energy is required, and thus resource saving, cost reduction, and the like are difficult to achieve.

For the method of using the organic solvent, a solvent other than water and an organic amide solvent is required, and as a result, complication of the process and increase in facility costs and running cost occur, and thus resource saving, cost reduction, and the like are similarly difficult to achieve.

Note that in a case where a solvent containing water is used as the washing liquid in the aforementioned washing in order to remove the organic amide solvent, the amount of water supplied is required to reduced from the perspective of resource saving, cost reduction, and the like.

In view of the foregoing, a first object of the present invention is to provide: a method of manufacturing PAS while efficiently recovering an organic amide solvent at a low energy cost, without using an organic solvent, from washing wastewater produced by washing a raw material mixture containing PAS and an organic amide solvent using a solvent containing water; and PAS manufactured by this method. A second object of the present invention is to provide: a method of manufacturing PAS by reducing the amount of water supplied when washing the raw material mixture using a solvent containing water; and PAS manufactured by this method.

Solution to Problem

The present inventors discovered that the aforementioned first object is achieved by utilizing an increase in temperature based on compressing the distilled vapor produced by distilling washing wastewater produced by washing the raw material mixture using a solvent containing water, and/or an increase in temperature based on compressing a heat medium heat-exchanged with the distilled vapor, and performing heating in the aforementioned distillation to obtain a recovered liquid containing a solvent containing water having a larger amount of the organic amide solvent, and distilling the recovered liquid as necessary to obtain a concentrated liquid containing a solvent with an even larger amount of the organic amide solvent. Furthermore, the present inventors discovered that the aforementioned second object is achieved by utilizing an increase in temperature based on compressing the distilled vapor produced by distilling washing wastewater produced by washing the raw material mixture using a solvent containing water, and/or an increase in temperature based on compressing a heat medium heat-exchanged with the distilled vapor, and performing heating in the aforementioned distillation, and then using the distilled liquid containing a condensate of the distilled vapor as the solvent containing water. Thereby, the present inventors completed the present invention.

Therefore, a first embodiment of the present invention is a method of manufacturing polyarylene sulfide, including the following steps:
(a) a washing step of mixing a solvent containing water with a raw material mixture that contains polyarylene sulfide and an organic amide solvent to obtain a dispersion, dissolving the organic amide solvent in the solvent containing water, and then washing the polyarylene sulfide;
(b) a separating step of solid-liquid separating the dispersion in the washing step to obtain a separated liquid; and
(c) a distilling step of separating the separated liquid into distilled vapor containing a solvent containing water having a smaller amount of the organic amide solvent, and recovered liquid containing a solvent containing water having a larger amount of the organic amide solvent by heating the separated liquid obtained in the separating step; wherein
heating in the distilling step is performed utilizing an increase in temperature based on compressing the distilled vapor and/or an increase in temperature based on compressing a heat medium heat-exchanged with the distilled vapor. The method may further include:
(d) an organic amide solvent concentrating step of distilling the recovered liquid to obtain a concentrated liquid containing a solvent with a higher amount of the organic amide solvent.

A second embodiment of the present invention is a method of manufacturing polyarylene sulfide, including the following steps:
(a) a washing step of mixing a solvent containing water with a raw material mixture that contains polyarylene sulfide and an organic amide solvent to obtain a dispersion, dissolving the organic amide solvent in the solvent containing water, and then washing the polyarylene sulfide;
(b) a separating step of solid-liquid separating the dispersion in the washing step to obtain a separated liquid; and
(c) a distilling step of separating the separated liquid into distilled vapor containing a solvent containing water having a smaller amount of the organic amide solvent, and recovered liquid containing a solvent containing water having a larger amount of the organic amide solvent by heating the separated liquid obtained in the separating step; wherein
heating in the distilling step is performed utilizing an increase in temperature based on compressing the distilled vapor and/or an increase in temperature based on compressing a heat medium heat-exchanged with the distilled vapor, and a distilled liquid containing a condensate of the distilled vapor is used as the solvent containing water in the washing step.

A third embodiment of the present invention is polyarylene sulfide manufactured by the aforementioned method.

Advantageous Effects of Invention

First, the present invention can provide: a method of manufacturing PAS while efficiently recovering an organic amide solvent at a low energy cost, without using an organic solvent, from washing wastewater produced by washing a raw material mixture containing PAS and an organic amide solvent using a solvent containing water; and PAS manufactured by this method. Second, the present invention can provide: a method of manufacturing PAS by reducing the amount of water supplied when washing the raw material mixture using a solvent containing water; and PAS manufactured by this method.

DESCRIPTION OF EMBODIMENTS

Figure 1:
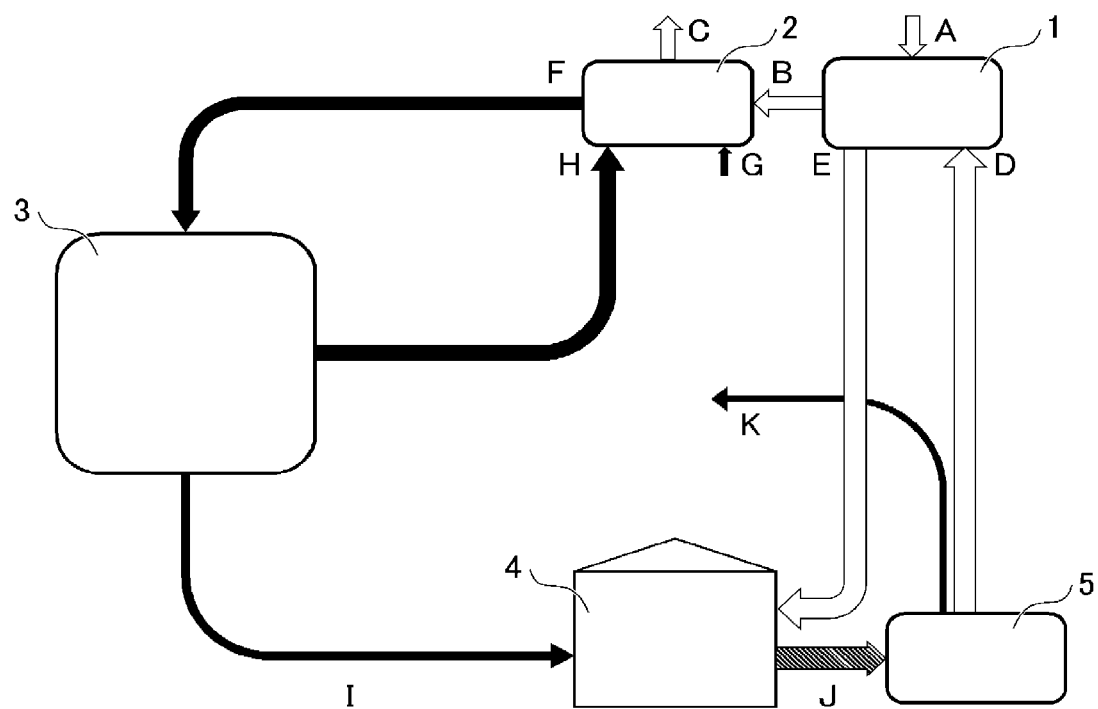
FIG. 1 is a schematic view illustrating a method of the present invention of manufacturing PAS while recovering an organic amide solvent from washing wastewater produced by washing a raw material mixture containing PAS and an organic amide solvent using a solvent containing water.

The raw material mixture containing PAS and an organic amide solvent is not particularly limited, and may be any mixture so long as PAS and an organic amide solvent are included.

For example, the raw material mixture is obtained through a polymerizing step of polymerization reacting a dihalo aromatic compound and at least one type of sulfur source selected from a group consisting of alkali metal sulfides and alkali metal hydrosulfides, in the organic amide solvent to obtain a reaction liquid containing PAS.

Alternatively, for example, the raw material mixture is obtained through: a preliminary washing step of mixing PAS or mixture containing PAS with a washing liquid containing an organic amide solvent to obtain a dispersion, and then washing the PAS; and a preliminary separating step of solid-liquid separating the dispersion in the preliminary washing step, and then separating into a separated liquid and mixture containing polyarylene sulfide.

Herein, the mixture containing PAS in the preliminary washing step is preferably obtained through a polymerizing step of polymerization reacting a dihalo aromatic compound and at least one type of sulfur source selected from a group consisting of alkali metal sulfides and alkali metal hydrosulfides, in the organic amide solvent to obtain a reaction liquid containing PAS.

Hereinafter, the following I. and II. first describe one example of manufacturing PAS. Note that the method of manufacturing PAS and polymerizing method at that time are not limited to the following methods, and may be any method so long as the effect of the present invention is not impaired.

I. PAS Manufacturing Method

1. Sulfur Source

At least one type of a sulfur source selected from a group consisting of alkali metal sulfides and alkali metal hydrosulfides is used as the sulfur source. Examples of the alkali metal sulfide can include lithium sulfides, sodium sulfides, potassium sulfides, rubidium sulfides, cesium sulfides, mixtures of two or more thereof, and the like.

Of these, the sodium sulfides and lithium sulfides are preferable from the perspective of being industrially available at a low cost.

Examples of the alkali metal hydrosulfide can include lithium hydrosulfides, sodium hydrosulfides, potassium hydrosulfides, rubidium hydrosulfides, cesium hydrosulfides, mixtures of two or more thereof, and the like. Of these, the sodium hydrosulfides and lithium hydrosulfides are preferable from the perspective of being industrially available at a low cost.

A small amount of the alkali metal hydrosulfide may also be included in the alkali metal sulfide. A small amount of the alkali metal sulfide may also be included in the alkali metal hydrosulfide. In these cases, a total molar amount of the alkali metal sulfide and alkali metal hydrosulfide is the sulfur source supplied to the polymerization reaction in the polymerizing step after the dehydrating step provided as necessary, in other words, an "added sulfur source".

When the alkali metal sulfide and alkali metal hydrosulfide are mixed and used, the mixture of the two will naturally be the added sulfur source.

When the sulfur source contains the alkali metal hydrosulfide, an alkali metal hydroxide is used in combination. Examples of the alkali metal hydroxide include lithium hydroxides, sodium hydroxides, potassium hydroxides, rubidium hydroxides, cesium hydroxides, and mixtures of two or more thereof. Of these, the sodium hydroxides and lithium hydroxides are preferable from the perspective of being industrially available at a low cost.

2. Dihalo Aromatic Compound

A dihalo aromatic compound (DHA) is a dihalogenated aromatic compound having two halogen atoms directly bonded to an aromatic ring. Halogen atoms refer to fluorine, chlorine, bromine, and iodine atoms, and in the same dihalo aromatic compound, two halogen atoms may be the same or different. These dihalo aromatic compounds can be used independently or in a combination of two or more types. Specific examples of the dihalo aromatic compounds include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides, dihalodiphenyl ketones, and the like. Of these, p-dihalobenzene, m-dihalobenzene, or a mixture of these two is preferable, p-dihalobenzene is more preferable, and p-dichlorobenzene (pDCB) is particularly preferable.

3. Branching/Cross-Linking Agent

In order to introduce a branched or crosslinked structure into the produced PAS, trihalobenzene is preferable as a polyhalo compound (and not necessarily an aromatic compound) where three or more halogen atoms are bonded and a polyhalo compound serving as a branching/crosslinking agent.

4. Organic Amide Solvent

An organic amide solvent which is an aprotic polar organic solvent is used as a solvent for a dehydration reaction or polymerization reaction. Specific examples of the organic amide solvent include: N,N-dimethylformamides, N,N-dimethylacetamides, and other amide compounds; N-methyl-ε-caprolactams and other N-alkylcaprolactam compounds; N-methyl-2-pyrrolidones, N-cyclohexyl-2-pyrrolidones, and other N-alkylpyrrolidone compounds or N-cycloalkylpyrrolidone compounds; 1,3-dialkyl-2-imidazolidinones and other N,N-dialkylimidazolidinone compounds; tetramethyl ureas and other tetraalkyl urea compounds; hexamethylphosphoric triamides and other hexaalkylphosphoric triamide compounds; and the like. These organic amide solvents may be used independently or in a combination of two or more types. Note that in the present invention, a difference between the boiling point of the organic amide solvent and boiling point of water is preferably 50° C. or higher, more preferably 70° C. or higher, and even more preferably 90° C. or higher, from the perspective of separating efficiency in the distilling step described later. An upper limit of the difference is not particularly limited, but is approximately 150° C.

Of these organic amide solvents, N-alkylpyrrolidone compounds, N-cycloalkylpyrrolidone compounds, N-alkylcaprolactam compounds, and N,N-dialkylimidazolidinone compounds are preferable, and N-methyl-2-pyrrolidones (NMP), N-methyl-ε-caprolactams, and 1,3-dialkyl-2-imidazolidinones are particularly preferably used. NMP is particularly preferable.

5. Polymerization Auxiliary Agent

In order to promote a polymerization reaction, various polymerization auxiliary agents can be used as necessary. Specific examples of particle modifiers include general well-known polymerization auxiliary agents of PAS such as water, organic carboxylic acid metal salts, organic sulfonic acid metal salts, halogenated halides and other alkali metal halides, alkali earth metal halides, alkali earth metal salts of an aromatic carboxylic acid, phosphoric acid alkali metal salts, alcohols, paraffin hydrocarbons, mixtures of two or more types thereof, and the like. An alkali metal carboxylate is preferable as the organic carboxylic acid metal salt. Examples of the alkali metal carboxylate can include lithium acetates, sodium acetates, potassium acetates, sodium propionates, lithium valerates, lithium benzoates, sodium benzoates, sodium phenyl acetates, potassium p-tolulates, and mixtures of two or more thereof. Sodium acetate is particularly preferable as the alkali metal carboxylate from the perspective of low cost and ease of procurement. The amount of the polymerization auxiliary agent used varies based on the type of compound, but is normally within a range of 0.01 to 10 mol, preferably 0.1 to 2 mol, more preferably 0.2 to 1.8 mol, and particularly preferably 0.3 to 1.7 mol with regard to 1 mol of the added sulfur source.

In a case where the polymerization auxiliary agent is an organic carboxylic metal salt, organic sulfonate, or alkali metal halide, the upper limit of the amount used is preferably 1 mol or less, and more preferably 0.8 mol or less with regard to 1 mol of added sulfur source.

6. Phase Separation Agent

Various phase separation agents may be used in order to promote the polymerization reaction and achieve a high degree of polymerization in PAS in a short amount of time, or to cause phase separation and obtain granular PAS. A phase separation agent refers to a compound that dissolves in an organic amide solvent alone or in the presence of a small amount of water, and reduces the solubility of PAS in the organic amide solvent. The phase separation agent itself is a compound that is not a PAS solvent.

Conventionally known compounds that are known to function as a phase separation agent can be used as the phase separation agent. The phase separation agents also include the compounds used as the aforementioned polymerization auxiliary agent, but herein, phase separation agent refers to a compound used in a quantitative ratio that enables a function as a phase separation agent in a step of performing a polymerization reaction in a phase separation condition, in other words, a phase separation polymerizing step, or a quantitative ratio sufficient for causing phase separation in the presence thereof after polymerization ends. Specific examples of phase separation agent include water, organic carboxylic acid metal salts, organic sulfonic acid metal salts, halogenated lithiums, alkali earth metal halides and other alkali metal halides, alkali earth metal salts of an aromatic carboxylic acid, phosphoric acid alkali metal salts, alcohols, paraffin hydrocarbons, and the like. Preferred examples of organic carboxylic acid metal salts include lithium acetates, sodium acetates, potassium acetates, sodium propionates, lithium valerates, lithium benzoates, sodium benzoates, sodium phenyl acetates, potassium p-tolulates, and other alkali metal carboxylates. These phase separation agents may be used independently or in a combination of two or more types. Of these phase separation agents, water which has low cost and simple post-treatment, or a combination of water and an organic carboxylic acid metal salt such as an alkali metal carboxylate or the like is particularly preferable.

Even in a case where water is used as the phase separation agent, combined used with another phase separation agent other than water is possible from the perspective of efficiently performing phase separation polymerization. When water and another phase separation agent are used together during the phase separation polymerizing step, the total amount thereof is preferably an amount that induces phase separation. At least a portion of the phase separation agent may be included when adding a polymerization reaction component, but the phase separation agent is preferably added during the polymerization reaction, or adjusted to an amount sufficient for forming phase separation after the polymerization reaction.

II. Polymerization

Manufacturing of PAS is performed by polymerization reacting DHA and at least one type of sulfur source selected from a group consisting of alkali metal sulfides and alkali metal hydrosulfides in an organic amide solvent to generated PAS.

Furthermore, a preferred polymerizing step of the present invention is a step of polymerization reacting DHA and at least one sulfur source selected from a group consisting of alkali metal sulfides and alkali metal hydrosulfides in an organic amide solvent containing water derived from a polymerization auxiliary agent, phase separation agent, or the like to generate a polymerization reaction liquid containing PAS.

In the present invention, the polymerizing method of manufacturing PAS may be any polymerizing method so long as the present invention is not impaired.

Polymerizing methods of manufacturing granular PAS are generally broadly classified into (i) methods where the polymerizing step includes a phase separation polymerizing step, and gradual cooling is performed after the phase separation polymerization, (ii) methods of polymerization reacting, adding a phase separation agent, and then gradually cooling, (iii) methods using a polymerization auxiliary agent such as lithium chloride or the like, (iv) methods of cooling a gas phase portion in a reactor, and the like.

Of these, when granular PAS is manufactured by a polymerizing method, including a polymerization reaction step performed by controlling polymerization conditions in a phase separation condition where a produced polymer dense phase and produced polymer dilute phase are mixed in a polymerization reaction system, in the presence of a phase separation agent (hereinafter, may be abbreviated as "phase separation polymerizing step"), granular PAS with a high degree of polymerization is obtained, and therefore, the sieving efficiency in the separating step increases, and yield and productivity improve. Therefore, the method is an advantageous polymerizing method for enhancing the yield of PAS of a granular product with a high degree of polymerization. The polymerizing step in this case will be described in detail.

1. Adding Step

The polymerizing step included in the manufacturing method of manufacturing PAS can be performed after the following adding step.

For the adding step, DHA and a mixture remaining in the system in the dehydrating step provided as necessary are mixed, water and an alkali metal hydroxide are added as necessary to prepare an added mixture containing an organic amide solvent, sulfur source (added sulfur source), water, and DHA.

The amount of DHA used is normally from 0.90 to 1.50 mol, preferably from 0.92 to 1.10 mol, and more preferably from 0.95 to 1.05 mol with regard to 1 mol of the added sulfur source. When the added molar ratio of DHA with regard to the sulfur source is too high, a polymer with a high molecular weight is difficult to generate. On the other hand, when the added molar ratio of DHA with regard to the sulfur source is too low, a decomposing reaction is less likely to occur, and a stable polymerization reaction is difficult to perform.

When an alkali metal hydrosulfide is used as the added sulfur source, the amount of alkali metal hydroxide used is normally from 0.95 to 1.09 mol, preferably from 0.98 to 1.085 mol, and more preferably from 0.99 to 1.08 mol with regard to 1 mol of the added sulfur source.

In order to distinguish from the sulfur source used in the dehydrating step, the sulfur source in the adding step is referred to as an "added sulfur source". The reason is because the amount of the sulfur source introduced into the reaction tank before the dehydrating step changes in the dehydrating step. The added sulfur source is consumed by the reaction with DHA in the polymerizing step, but the molar amount of the added sulfur source is based on the molar amount in the adding step. The amount of the added sulfur source is calculated by an equation [added sulfur source]=[total molar amount of the added sulfur]−[molar amount of volatilized sulfur after dehydrating].

In the adding step, the amount of organic amide solvent is normally from 0.1 to 10 kg, preferably from 0.13 to 5 kg, and more preferably from 0.15 to 2 kg with regard to 1 mol of the added sulfur source.

2. Polymerizing Step

In the polymerizing step, an added mixture prepared by the aforementioned adding step is heated normally to a temperature of 170 to 290° C., preferably 180 to 280° C., and more preferably 190 to 275° C., and a polymerization reaction is started to promote polymerization. The polymerization reaction time is generally within a range of 10 minutes to 72 hours, and preferably 30 minutes to 48 hours. The polymerization reaction is preferably performed in a two-stage step of a first-stage polymerizing step and second-stage polymerizing step.

The polymerizing step includes a polymerizing step of polymerizing DHA and at least one type of sulfur source selected from a group consisting of alkali metal sulfides and alkali metal hydrosulfides in an organic amide solvent, in a condition where a produced polymer dense phase and a produced polymer dilute phase are mixed in a polymerization reaction system in the presence of a phase separation agent, and the polymerization reaction is performed at a temperature of 170 to 290° C. The phase separation agent is preferably water as previous described, a compound known to function as a phase separation agent, or the like.

Furthermore, the polymerizing step is preferably such that DHA and at least one type of sulfur source selected from a group consisting of alkali metal sulfides and alkali metal hydrosulfides are polymerization reacted at a temperature of 170 to 270° C. in an organic amide solvent, a phase separation agent is added in the polymerization reaction mixture at a point in time that the conversion ratio of the DHA is 30% or higher, such that the phase separation agent is present in the polymerization reaction system, the polymerization reaction mixture is increased in temperature, and then the polymerization reaction is continued at a temperature of 245 to 290° C. in a condition where a produced polymer dense phase and a produced polymer dilute phase are mixed in the polymerization reaction system in the presence of the phase separation agent.

Furthermore, in the polymerizing step, a polymerization reaction is preferably performed by at least a two-stage polymerizing step including: a first-stage polymerizing step of polymerization reacting DHA and at least one type of sulfur source selected from a group consisting of alkali metal sulfides and alkali metal hydrosulfides in an organic amide solvent to generate a polymer with a conversion ratio of the DHA that is 30% or higher, and preferably from 80 to 99%; and second-stage polymerizing step of continuing the polymerization reaction in a condition where a produced polymer dense phase and produced polymer dilute phase are mixed in a polymerization reaction system in the presence of a phase separation agent.

Specifically, in the polymerizing step, a polymerization reaction is more preferably performed by at least a two-stage polymerizing step including: a first-stage polymerizing step of polymerization reacting DHA and at least one type of sulfur source selected from a group consisting of alkali metal sulfides and alkali metal hydrosulfides in an organic amide solvent, in a condition where from 0.01 to 2.0 mol of water per 1 mol of the added sulfur source is present, at a temperature of 170 to 270° C. to generate a polymer with a conversion ratio of the DHA that is from 80 to 99%; and a second-stage polymerizing step of continuing the polymerization reaction in a phase separation condition where a produced polymer dense phase and produced polymer dilute phase are mixed in the polymerization reaction system, by heating to a temperature of 245 to 290° C. in conjunction with adjusting the amount of water in the polymerization reaction system so as to achieve a condition where greater than 2.0 mol and 10 mol or less of water is present per 1 mol of the added sulfur source.

The DHA conversion ratio is a value calculated by equations below. In a case where the DHA is excessively added at high molar ratio than the sulfur source, the conversion ratio is calculated based on the equation:

Conversion ratio=[[DHA added amount (mol)−DHA residual amount (mol)][DHA added amount (mol)−DHA excess amount (mol)]]×100.

In other cases, the conversion ratio is calculated based on the equation below:

Conversion ratio=[[DHA added amount (mol)−DHA residual amount (mol)][DHA added amount (mol)]]×100.

The coexisting water amount in the reaction system in the first-stage polymerizing step is normally within a range of 0.01 to 2.0 mol, preferably 0.05 to 1.8 mol, more preferably 0.5 to 1.6 mol, and particularly preferably 0.8 to 1.5 mol.

A polymer (may be referred to as a "prepolymer") with a melt viscosity measured at a temperature of 310° C. and shear rate of 1216 sec-1 that is normally from 0.1 to 30 Pa·s is preferably generated in the first-stage polymerizing step.

The second-stage polymerizing step is not a step of simply separating/granulating a polymer (prepolymer) generated in the first-stage polymerizing step, but is a step for inducing increase in the degree of polymerization of the polymer (prepolymer).

In the second-stage polymerizing step, water is particularly preferably used as the phase separation agent, and the amount of water in the polymerization reaction system is preferably adjusted such that a condition is achieved where greater than 2.0 mol and 10 mol or less, preferably greater than 2.0 and 9 mol or less, more preferably from 2.1 to 8 mol, and particularly preferably from 2.2 to 7 mol of water is present per 1 mol of the added sulfur source. In the second-stage polymerizing step, when the coexisting amount of water in the polymerization reaction system is 2.0 or less or exceeds 10 mol per 1 mol of the added sulfur source, the degree of polymerization of the generated PAS may be reduced. In particular, when the second-stage polymerization is performed within a range where the coexisting amount of water is from 2.2 to 7 mol, PAS with a high degree of polymerization is easy to be obtained, which is preferable.

In a more preferable manufacturing method, water and another phase separation agent other than water can be used in combination as the phase separation agent in order to perform polymerization with a small amount of the phase separation agent. In this aspect, the amount of water in the polymerization reaction system is adjusted within a range of 0.1 to 10 mol, preferably 0.3 to 10 mol, more preferably 0.4 to 9 mol, and particularly preferably 0.5 to 8 mol per 1 mol of the added sulfur source, and the other phase separation agent other than water is preferably present within a range of 0.001 to 3 mol per 1 mol of the added sulfur source. Other particularly preferable phase separation agents for combined use with water include organic carboxylic acid metal salts, and of these, alkali metal carboxylates are preferable. In this case, water is preferably used within a range of 0.5 to 10 mol, preferably 0.6 to 7 mol, and particularly preferably 0.8 to 5 mol, and the alkali metal carboxylate is preferably used within a range of 0.001 to 0.7 mol, preferably 0.02 to 0.6 mol, and particularly preferably 0.05 to 0.5 mol.

The polymerization temperature in the second-stage polymerizing step is within a range of 245 to 290° C. When the polymerization temperature is less than 245° C., PAS with a high degree of polymerization is difficult to obtain, and when the temperature exceeds 290° C., the PAS and organic amide solvent may decompose. In particular, a temperature range of 250 to 270 is preferable because PAS with a high degree of polymerization is easy to obtain.

3. Dehydrating Step Provided if Desired

In PAS manufacturing, a dehydrating step may be provided as desired before the adding step when performing the polymerizing step.

In the dehydrating step, dehydration is performed until water containing hydrated water (crystal water), an aqueous medium, byproduct water, or the like is within a required range.

In the dehydrating step, dehydration is performed until the coexisting amount of water in the polymerization reaction system is normally from 0.01 to 2.0 mol, preferably from 0.05 to 1.8 mol, and more preferably from 0.5 to 1.6 mol with regard to 1 mol of the added sulfur source. As described above, the sulfur source before starting the polymerizing step after the dehydrating step is referred to as the "added sulfur source". In a case where the amount of water in the dehydrating step is too low, water may be added before the polymerizing step to adjust to a desired amount of water.

In a case where alkali metal hydrosulfide is used as the sulfur source, in the dehydrating step, a mixture containing an organic amide solvent, alkali metal hydrosulfide, and from 0.9 to 1.1 mol, preferably from 0.91 to 1.08 mol, more preferably from 0.92 to 1.07 mol, and particularly preferably from 0.93 to 1.06 mol of an alkali metal hydroxide per 1 mol the alkali metal hydrosulfide is preferably heated and reacted, and then at least one portion of a distillate containing water is preferably discharged to the outside of a system from inside the system containing the mixture.

III. Preliminary Washing and Preliminary Separation

1. Preliminary Washing Step

In the preliminary washing step, PAS is washed using a washing liquid containing an organic amide solvent, in order to remove PAS or water insoluble impurities mixed in a mixture containing PAS, such as PAS oligomers, decompositions products in the polymerizing step or the like, unreacted raw materials (for example, unreacted DHA such as unreacted pDCB and the like), and other components with a low molecular weight.

Examples of the washing liquid containing an organic amide solvent include organic amide solvents, mixtures of an organic amide solvent and water, a ketone, alcohol, hexane, or other solvent, and the like. Mixtures of an organic solvent and water are preferable, and organic amide solvents are more preferable. The ratio of the organic amide solvent in the washing liquid containing the organic amide solvent is preferably from 50 to 100 mass %, more preferably from 60 to 100 mass %, even more preferably from 70 to 100 mass %, yet even more preferably from 80 to 100 mass %, and particularly preferably from 90 to 100 mass %.

Note that in the first embodiment of the present invention, the washing liquid in the preliminary washing step is preferably at least a portion of a recovered liquid obtained in the distilling step described later and/or at least a portion of a concentrated liquid obtained in the organic amide solvent concentrating step described later, from the perspective of resource saving, cost reduction, and the like, and is more preferably at least a portion of the concentrated liquid obtained in the organic amide solvent concentrating step, from the perspective of higher purity of the organic amide solvent.

Similarly, in the second embodiment of the present invention, the washing liquid in the preliminary washing step is preferably at least a portion of a recovered liquid obtained in the distilling step described later from the perspective of resource saving, cost reduction, and the like.

2. Preliminary Separating Step

In the preliminary separating step, a dispersion in the preliminary washing step is solid-liquid separated and then separated into a mixture containing PAS and a separated liquid. The aforementioned dispersion may be a dispersion during washing in the preliminary washing step, or may be a dispersion after washing in the preliminary washing step. The dispersion during washing is a dispersion in a case where clearly distinguishing between the preliminary washing step and preliminary separating step is difficult as with a case where washing and separating are performed in a continuous washing tower or the like, and the dispersion after washing is a dispersion in a case where the preliminary washing step and preliminary separating step can be clearly distinguished.

In the preliminary separating step, solid-liquid separation is performed by sieving using a screen, centrifugal separating by a centrifugal separator, or the like for example.

The opening diameter of the screen used for separating by sieving in the preliminary separating step is normally from 75 μm (200 mesh) to 180 μm (80 mesh), and preferably an opening diameter of from 90 μm (170 mesh) to 150 μm (100 mesh). At least one screen within this range may be used, but multiple screens may also be used. Normally, a screen with opening diameter of 150 μm (100 mesh) is often used.

IV. Recovery of Organic Amide Solvent and/or Water

1. Washing Step

In the washing step, a solvent containing water is mixed with a raw material mixture that contains PAS and an organic amide solvent to obtain a dispersion, the organic amide solvent is dissolved in the solvent containing water, and then the PAS is washed.

Examples of the solvent containing water include water, mixed solvents of water and an organic amide solvent, alcohol, ketone, other solvent, and the like. Water and a mixed solvent of water and an organic amide solvent are preferable, and a mixed solvent of water and an organic amide solvent is more preferable. The ratio of water in the solvent containing water is preferably from 50 to 100 mass %, more preferably from 70 to 100 mass %, even more preferably from 90 to 100 mass %, yet even more preferably from 95 to 100 mass %, and particularly preferably from 98 to 100 mass %.

2. Separating Step

In the separating step, the dispersion is solid-liquid separated in the washing step to obtain a separated liquid. The aforementioned dispersion may be a dispersion during washing in the washing step, or may be a dispersion after washing in the washing step. The dispersion during the washing is a dispersion in a case where clearly distinguishing between the washing step and separating step is difficult as with a case where washing and separating are performed in a continuous washing tower or the like, and the dispersion after washing is a dispersion in a case where the washing step and separating step can be clearly distinguished.

Solid-liquid separation in the separating step can be performed similarly as in the preliminary separating step.

Note that the PAS separated in the separating step is recovered as a product. The recovery rate of the PAS recovered as a product is calculated using the mass of PAS (theoretical amount) when all effective sulfur components in the added sulfur source present in the reactor after the dehydrating step are assumed to be converted to PAS as the total amount of the obtained PAS.

The recovery rate is also dependent on the opening diameter of the sieve screen, but in a case where at least one screen with an opening diameter within a range of 75 μm (200 mesh) to 180 μm (80 mesh) is used, the rate is normally 80 mass % or higher, in some cases 83 mass % or higher, and in some cases 85 mass % or higher. An upper limit of the recovery rate is approximately 99.5 mass %.

Furthermore, the average particle size of the obtained PAS is also dependent on the opening diameter of the sieve screen, but in a case where at least one screen with an opening diameter within a range of 75 μm (200 mesh) to 180 μm (80 mesh) is used, the particle size is normally from 100 to 5000 μm, preferably from 120 to 3000 μm, and more preferably from 130 to 1500 μm.

The melt viscosity of the obtained PAS is also dependent on the opening diameter of the sieve screen, but in a case where at least one screen with an opening diameter within a range of 75 μm (200 mesh) to 180 μm (80 mesh) is used, the melt viscosity of the PAS is normally from 0.5 to 5000 Pa·s, preferably from 1 to 4500 Pa·s, and more preferably from 2 to 4000 Pa·s at a measurement under a condition of a 310° C. temperature and 1216 sec-1 shear rate.

3. Distilling Step

In the distilling step, the separated liquid is separated into distilled vapor containing a solvent containing water having a smaller amount of the organic amide solvent, and recovered liquid containing a solvent containing water having a larger amount of the organic amide solvent by heating the separated liquid obtained in the separating step. Heating in the distilling step is performed utilizing an increase in temperature based on compressing the distilled vapor and/or an increase in temperature based on compressing a heat medium heat-exchanged with the distilled vapor. The aforementioned heating may be performed in combination with other temperature increasing means, and when performed in combination, the heating is preferably primarily performed utilizing an increase in temperature based on compressing the distilled vapor and/or an increase in temperature based on compressing a heat medium heat-exchanged with the distilled vapor. Note that the recovered liquid containing a solvent containing water with a high amount of the organic amide solvent contains the organic amide solvent with a sufficient concentration and quality, and therefore, at least a portion of the recovered liquid can be used as a reaction solvent in the aforementioned polymerizing step.

In the distilling step, distilling is performed using a so-called heat pump, and therefore, a large amount of energy consumed in order to evaporate water from the separated liquid obtained in the separating step is recovered again as energy, and can be used in heating the aforementioned separated liquid. As a result, distillation can be performed with from approximately 10% to approximately 40% of the energy as compared to in a case where distillation is performed without using a heat pump.

Furthermore, in the second embodiment of the present invention, a distilled liquid containing a condensate of the distilled vapor (hereinafter, may be referred to as "distilled liquid in the distilling step") is used as the solvent containing water in the washing step. Thereby, water can be re-used, and the amount of water supplied from outside can be reduced. Note that from the perspective of re-using water, a distilled liquid derived from the distilled vapor by distilling in the organic amide solvent concentrating step described later (hereinafter, may be referred to as "distilled liquid in the organic amide solvent concentrating step") can be used as the solvent containing water in the washing step. However, in a case where a mixture containing a separated liquid separated in the preliminary separating step is used as the distillation target in the organic amide solvent concentrating step as described later, for example, the distilled liquid in the organic amide solvent concentrating step is more likely to contain impurities, and therefore, the distilled liquid in the distilling step is primarily preferably used as the solvent containing water in the washing step.

The method of distilling using a so-called heat pump is not particularly limited, and an example includes a method using a device according to JP 2014-168740 A. The distillation system may be a single-stage system or multi-stage system, but a single-stage system is preferable. Furthermore, the heat medium heat-exchanged with the aforementioned distilled vapor is not particularly limited, and examples include fluorocarbons such as Freon (trade name), ammonia, and hydrocarbons.

4. Organic Amide Solvent Concentrating Step

In the organic amide solvent concentrating step, the recovered liquid separated in the distilling step is distilled to obtain a concentrated liquid containing a solvent with an even higher amount of the organic amide solvent. The distilling method is not particularly limited, and a conventional known method can be used.

In a case where the raw material mixture is obtained through the preliminary washing step and preliminary separating step, distillation of the recovered liquid in the organic amide solvent concentrating step may be performed by distilling the mixture of the recovered liquid and separated liquid separated in the preliminary separating step.

Note that at least a portion of the distilled liquid derived from the distilled vapor by distilling in the organic amide solvent concentrating step may be removed, or the total amount of the distilled liquid or the aforementioned remainder of the distilled liquid not removed may be re-used as a washing liquid in the washing step. In the present invention, the amount of water separated in the distilled liquid is significantly reduced, and therefore, even in a case where a portion of the distilled liquid is removed, the effects from the perspective of resource saving, cost reduction, and the like may be minimized.

The ratio of the organic amide solvent in the concentrated liquid obtained by the organic amide solvent concentrating step is preferably from 50 to 100 mass %, more preferably from 60 to 100 mass %, even more preferably from 70 to 100 mass %, yet even more preferably from 80 to 100 mass %, and particularly preferably from 90 to 100 mass %.

Note that the concentrated liquid obtained in the organic amide solvent concentrating step contains the organic amide solvent with a sufficient concentration and quality, and therefore, at least a portion of the concentrated liquid may be used as the reaction solvent in the aforementioned polymerizing step. At least a portion of the concentrated liquid may be used in combination with at least a portion of the aforementioned recovered liquid.

V. Example of Material Balance

FIG. 1 is a schematic view illustrating a method of the present invention of manufacturing PAS while recovering an organic amide solvent from washing wastewater produced by washing a raw material mixture containing PAS and an organic amide solvent using a solvent containing water. On the other hand, FIG. 2 is a schematic view illustrating a conventional method of manufacturing PAS while recovering an organic amide solvent from washing wastewater produced by washing a raw material mixture containing PAS and an organic amide solvent using a solvent containing water.

In FIG. 1, a raw material mixture A containing PAS and NMP is washed by NMP in a preliminary washing and separating device 1, and then separated into NMP E and a PAS-containing mixture B containing PAS and NMP. The PAS-containing mixture B is washed by a solvent containing water in a washing and separating device 2, and then separated into a water-containing solvent F and product PAS C containing PAS and water. The water-containing solvent F is separated into distilled liquid H derived from distilled vapor containing a solvent containing water with a smaller amount of NMP, and recovered liquid I containing a solvent containing water with a larger amount of NMP, by a thermal recovery distilling device 3 using a so-called heat pump. The distilled liquid H is re-used as a washing liquid in the washing and separating device 2. On the other hand, the recovered liquid I is mixed with the NMP E in a mixing tank 4, and a solvent containing water J is distilled in a distilling device 5 and then separated into NMP D and water K. The NMP D is re-used as NMP used in the preliminary washing and separating device 1. On the other hand, the water K is removed.

Figure 2:
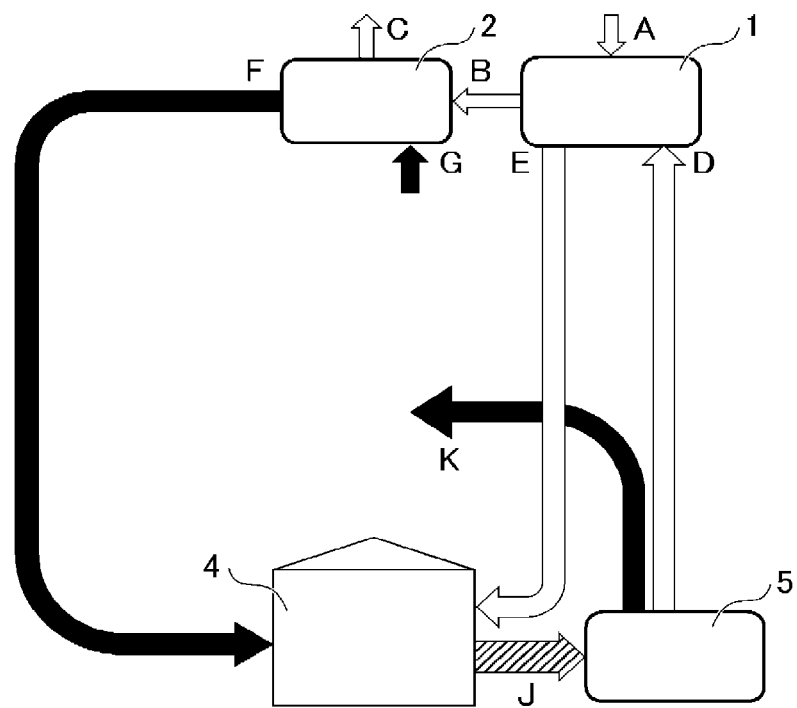
FIG. 2 is a schematic view illustrating a conventional method of manufacturing PAS while recovering an organic amide solvent from washing wastewater produced by washing a raw material mixture containing PAS and an organic amide solvent using a solvent containing water.

FIG. 2 is similar to FIG. 1 except that the thermal recovery distilling device 3 is not used, the water-containing solvent F is directly introduced in the mixing tank 4, and the distilled liquid H is not supplied to the washing and separating device 2.

Table 1 shows an example of material balance in FIG. 1. On the other hand, Table 2 shows an example of material balance in FIG. 2. Note that the numerical value units in Tables 1 and 2 are parts by mass.

TABLE 1

|  | A | B | C | D | E | F | G | H | I | J | K |
|---|---|---|---|---|---|---|---|---|---|---|---|
| NMP | 400 | 75 |  | 400 | 725 | 75 |  | 5 | 75 | 800 |  |
| Water |  |  | 75 |  | 0 | 1400 | 125 | 1350 | 50 | 50 | 50 |
| PAS | 100 | 100 | 100 |  | 0 | 0 |  |  |  | 0 |  |
| NMP concentration (mass %) |  |  |  |  |  | 5.1 |  | 0.4 | 60.0 | 94.1 |  |

TABLE 2

|  | A | B | C | D | E | F | G | J | K |
|---|---|---|---|---|---|---|---|---|---|
| NMP | 400 | 75 |  | 400 | 725 | 75 |  | 800 |  |
| Water |  |  | 75 |  | 0 | 1400 | 1475 | 1400 | 1400 |
| PAS | 100 | 100 | 100 |  | 0 | 0 |  | 0 |  |
| NMP concentration (mass %) |  |  |  |  |  | 5.1 |  | 36.4 |  |

As seen from Tables 1 and 2, with the method of the present invention, the amount (125 parts by mass) of the water G supplied to the washing and separating device 2 is reduced by approximately 1/10 as compared with a conventional method (1475 parts by mass). Furthermore, with the method of the present invention, the amount (50 parts by mass) of water in the water-containing solvent J is significantly reduced as compared with a conventional method (1400 parts by mass), and therefore, the amount of energy used required for separating water from NMP by the distilling device 5 is significantly reduced.

REFERENCE SIGNS LIST

1 Preliminary washing and separating device
2 Washing and separating device
3 Thermal recovery distilling device
4 Mixing tank
5 Distilling device

What is claimed is:

1. A method of manufacturing polyarylene sulfide, comprising:

(a) a washing step of mixing a solvent containing water with a raw material mixture that contains polyarylene sulfide and an organic amide solvent to obtain a dispersion, dissolving the organic amide solvent in the solvent containing water, and then washing the polyarylene sulfide;

(b) a separating step of solid-liquid separating the dispersion in the washing step to obtain a separated liquid;

(c) a distilling step of separating the separated liquid into distilled vapor containing a solvent containing water having a smaller amount of the organic amide solvent, and recovered liquid containing a solvent containing water having a larger amount of the organic amide solvent by heating the separated liquid obtained in the separating step;

(d) an organic amide solvent concentrating step of distilling the recovered liquid to obtain a concentrated liquid containing a solvent with an even higher amount of the organic amide solvent, wherein heating in the distilling step is performed utilizing an increase in temperature based on compressing the distilled vapor and/or an increase in temperature based on compressing a heat medium heat-exchanged with the distilled vapor, a distilled liquid containing a condensate of the distilled vapor is used as the solvent containing water in the washing step, the raw material mixture is obtained through a preliminary washing step of mixing polyarylene sulfide or mixture containing polyarylene sulfide with a washing liquid containing an organic amide solvent to obtain a dispersion, and then washing the polyarylene sulfide, and a ratio of the organic amide solvent in the concentrated liquid obtained in the organic amide solvent concentrating step is from 90 to 100 mass %.

2. The method according to claim 1, wherein the raw material mixture is obtained through a preliminary separating step of solid-liquid separating the dispersion in the preliminary washing step, and then separating into a separated liquid and mixture containing polyarylene sulfide.

3. The method according to claim 1, wherein at least one portion of the recovered liquid is used as the washing liquid.

4. The method according to claim 1, wherein the raw material mixture is obtained through a polymerizing step of polymerization reacting a dihalo aromatic compound and at least one type of sulfur source selected from a group consisting of alkali metal sulfides and alkali metal hydrosulfides, in the organic amide solvent to obtain a reaction liquid containing polyarylene sulfide.

5. The method according to claim 1, wherein the mixture containing polyarylene sulfide in the preliminary washing step is obtained through a polymerizing step of polymerization reacting a dihalo aromatic compound and at least one type of sulfur source selected from a group consisting of alkali metal sulfides and alkali metal hydrosulfides, in the organic amide solvent to obtain a reaction liquid containing polyarylene sulfide.

6. The method according to claim 1, wherein a difference between a boiling point of the organic amide solvent and boiling point of water is 50° C. or higher.

* * * * *